(12) United States Patent
Kadowaki et al.

(10) Patent No.: US 7,554,671 B2
(45) Date of Patent: *Jun. 30, 2009

(54) ABSOLUTE POSITION MEASUREMENT APPARATUS

(75) Inventors: Hidejiro Kadowaki, Kanagawa-ken (JP); Ko Ishizuka, Saitama-ken (JP); Shigeki Kato, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

This patent is subject to a terminal disclaimer.

(21) Appl. No.: 11/459,861

(22) Filed: Jul. 25, 2006

(65) Prior Publication Data

US 2007/0024863 A1 Feb. 1, 2007

(30) Foreign Application Priority Data

Jul. 28, 2005 (JP) ............................. 2005-218981

(51) Int. Cl.
*G01B 11/02* (2006.01)
(52) U.S. Cl. ...................................... 356/493; 356/497
(58) Field of Classification Search ................. 356/493, 356/498, 487, 479, 497
See application file for complete search history.

(56) References Cited

U.S. PATENT DOCUMENTS 6,618,218 B1 9/2003 Kadowaki

| | | | |
|---|---|---|---|
| 2003/0081222 A1* | 5/2003 | Kato | 356/495 |
| 2007/0024862 A1* | 2/2007 | Kadowaki et al. | 356/498 |
| 2007/0195330 A1* | 8/2007 | Ohashi et al. | 356/498 |

OTHER PUBLICATIONS

Akio Hirai, Hirokazu Matsumoto: "High-sensitivity surface-profile measurements by heterodyne white-light interferometer" Optical Engineering, vol. 40, No. 3, Mar. 2001, pp. 387-391, XP002406320 *figure 3* *pp. 388-p. 389*.

* cited by examiner

*Primary Examiner*—Patrick J Connolly
(74) *Attorney, Agent, or Firm*—Canon USA Inc IP Div

(57) ABSTRACT

A first beam having high coherence and a second beam having low coherence and having a central wavelength difference from that of the first beam are multiplexed onto the same optical axis. First and second multiplexed beams obtained by beam splitting are emitted at a measurement reflection plane and a reference plane, respectively. The reflected first and second multiplexed beams are multiplexed and interfere with each other. The interference generates a first interference signal that is obtained from the first beams at the interference unit and that relates to information on the distance to the measurement reflection plane and a second interference signal that is obtained from the second beams. The first and second interference signals are used to carry out calculations for determining the position of a measurement origin for the measurement reflection plane.

9 Claims, 10 Drawing Sheets

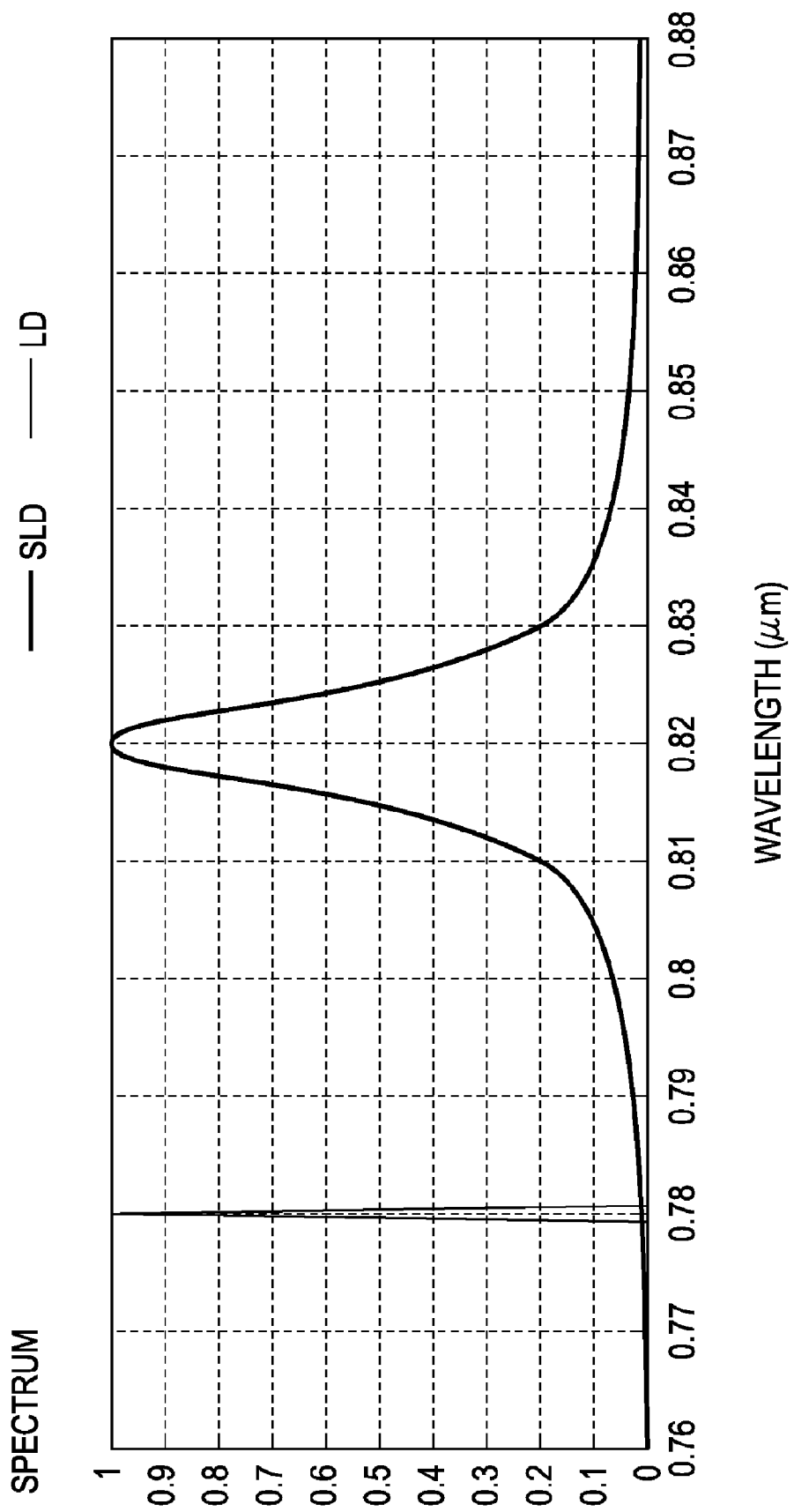

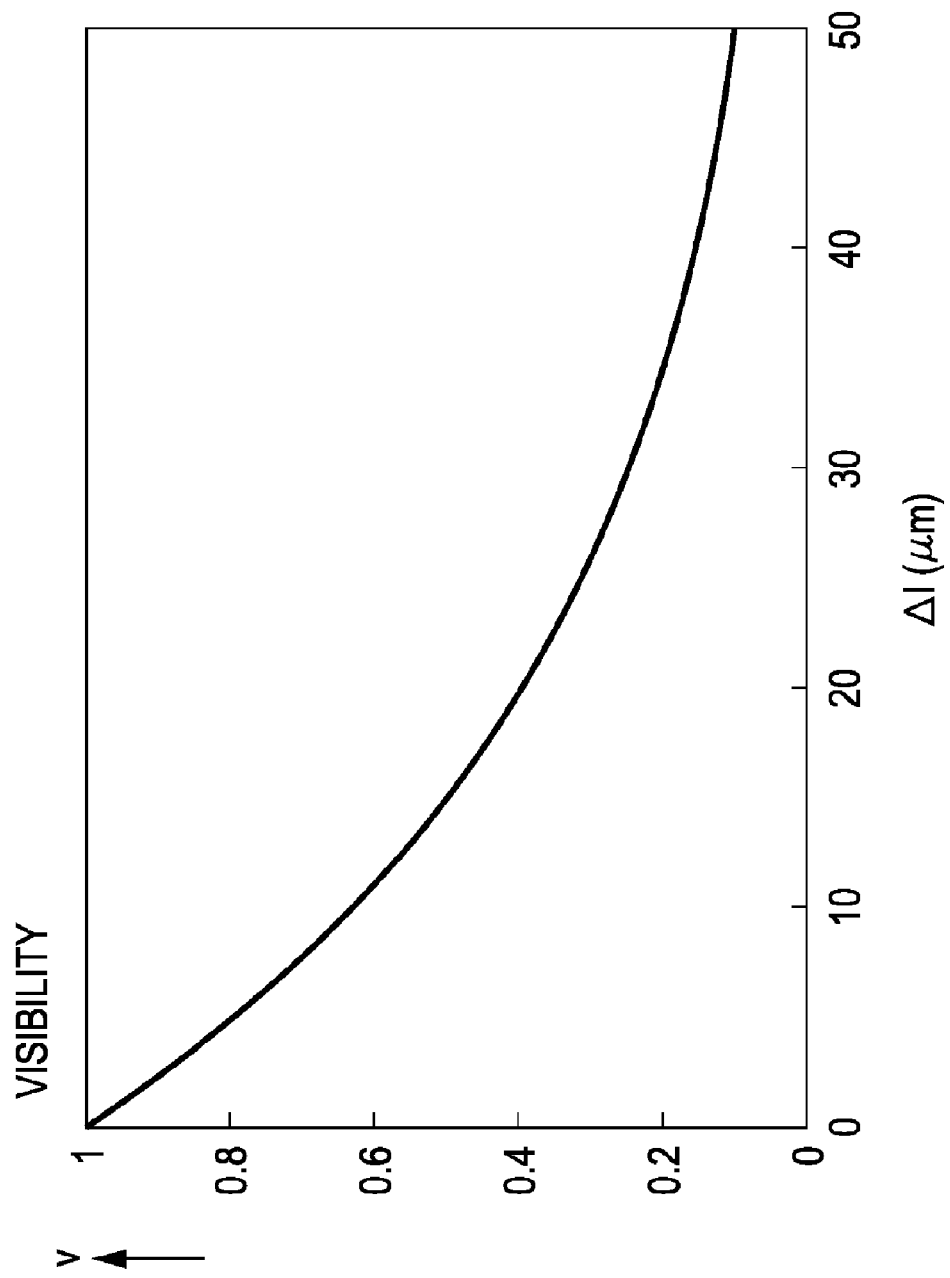

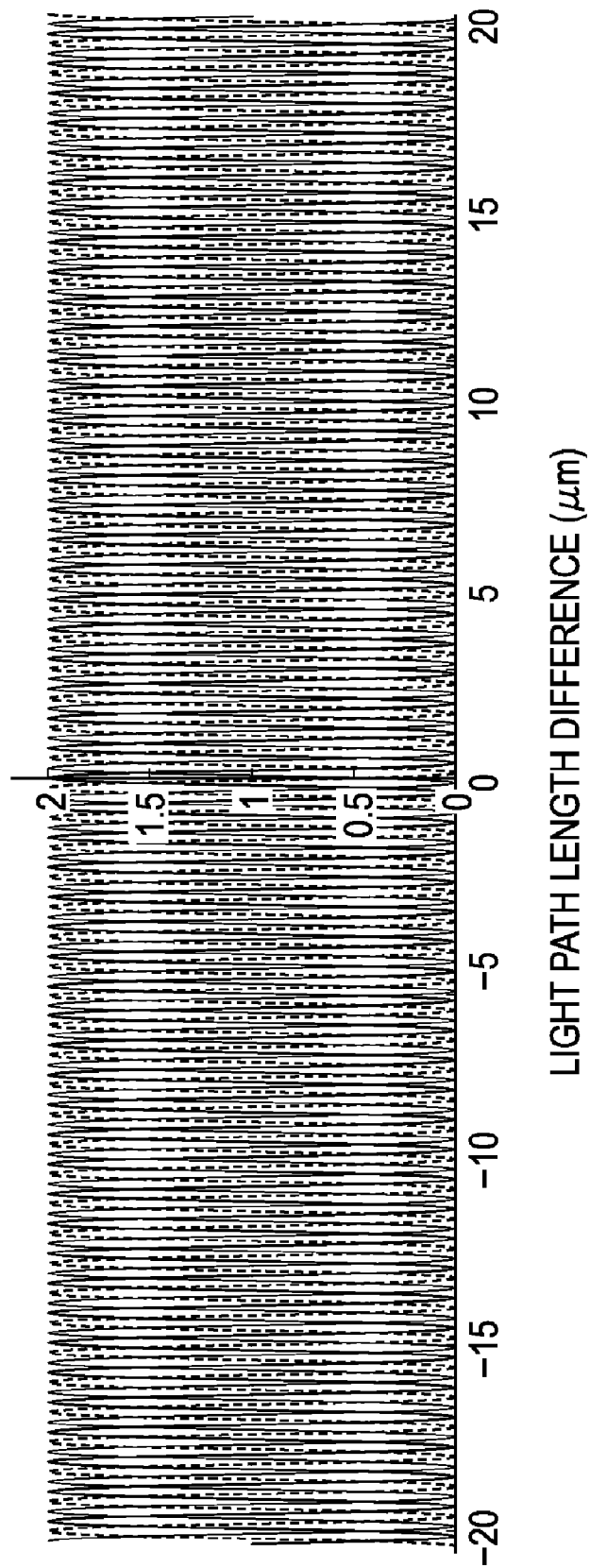

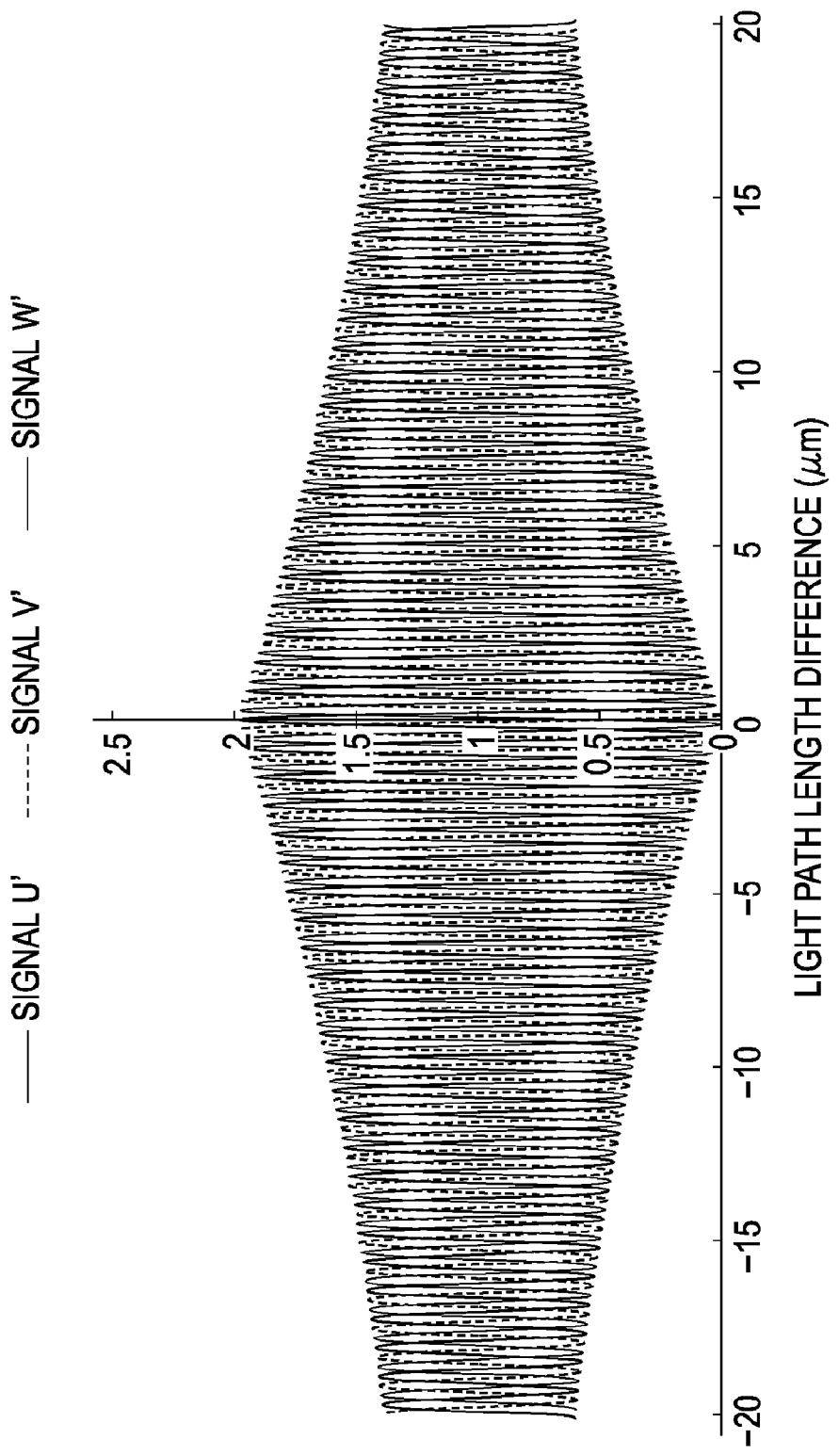

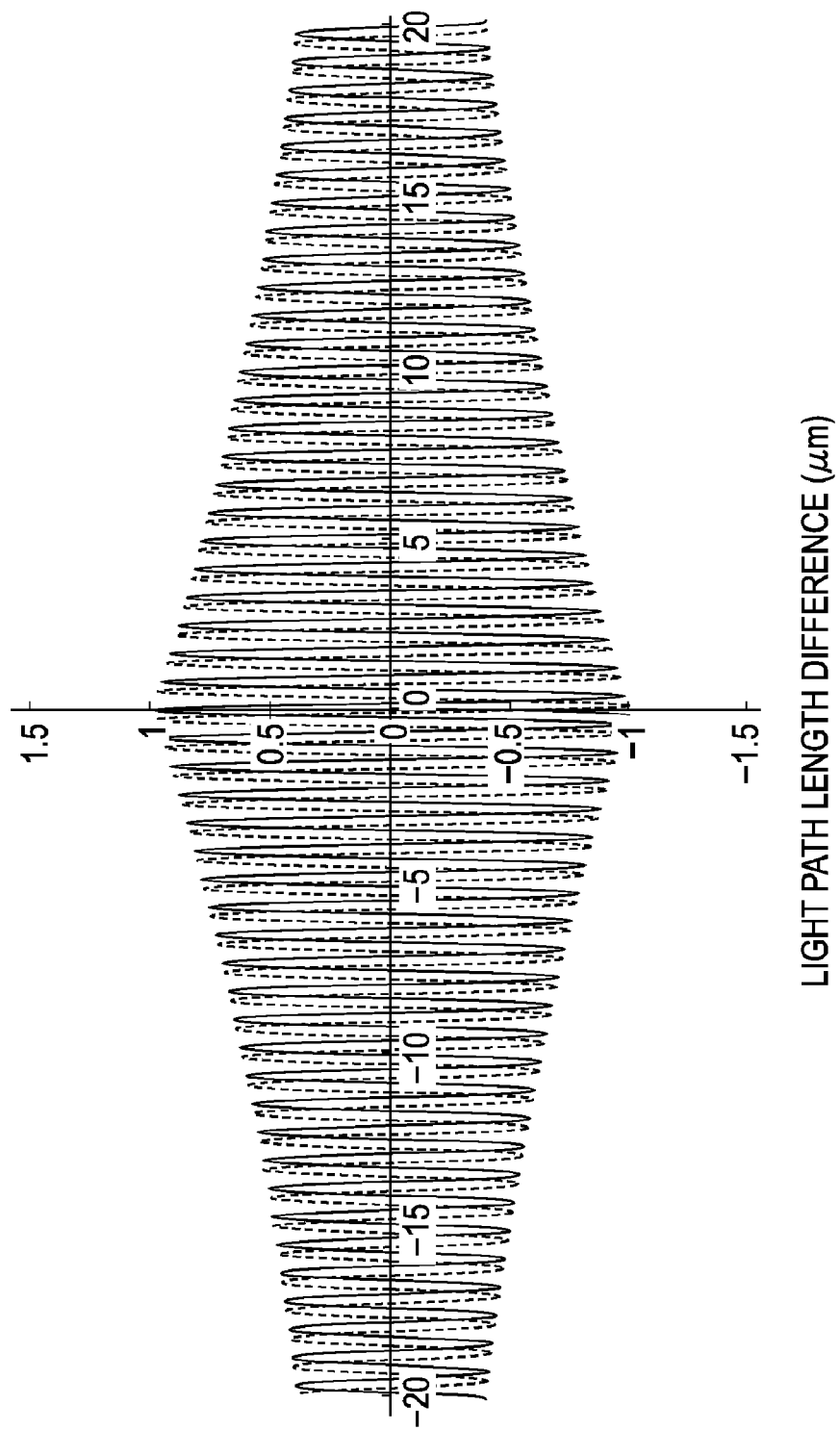

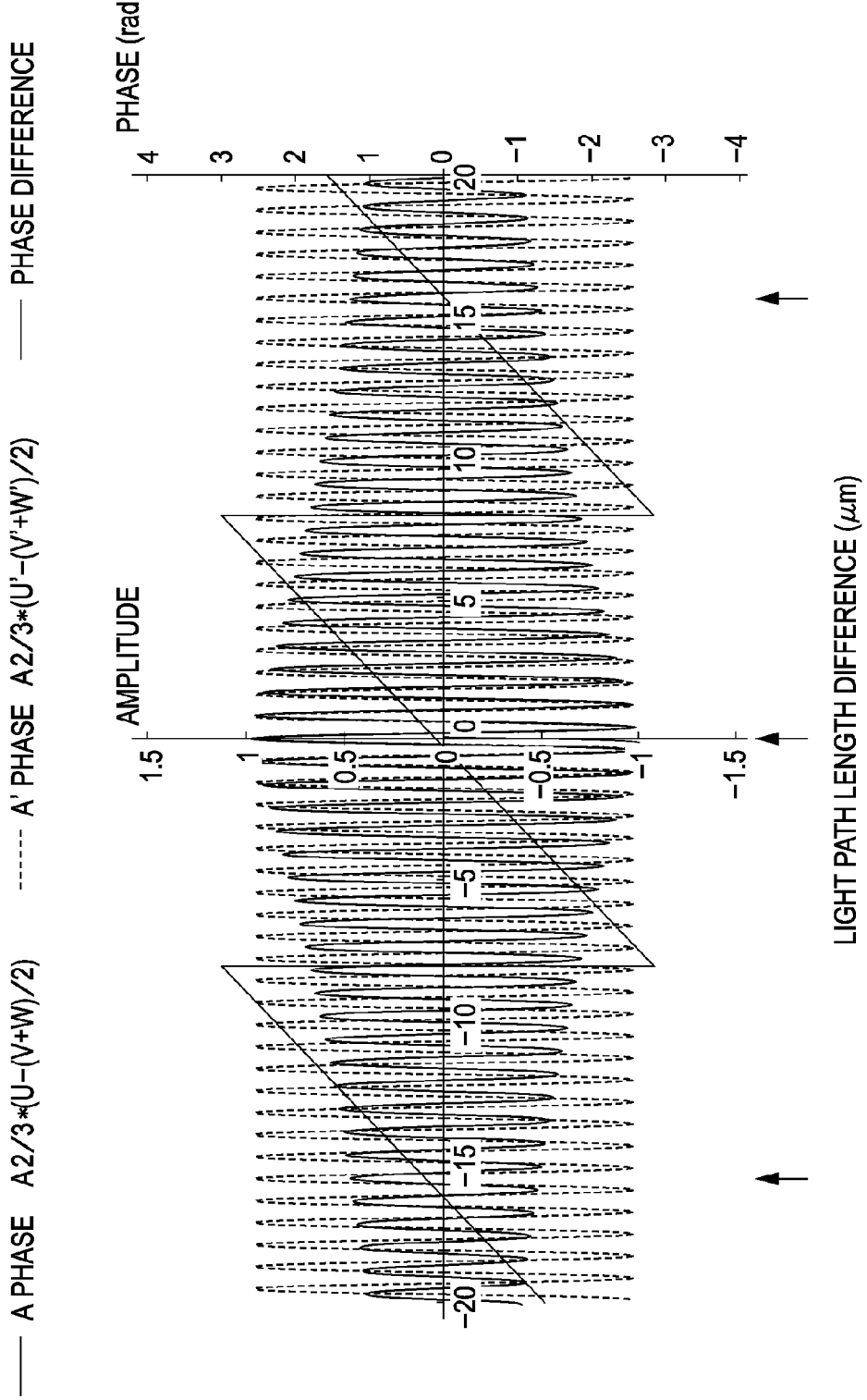

ABSOLUTE POSITION MEASUREMENT APPARATUS

BACKGROUND OF THE INVENTION

1. Field of the Invention

The present invention relates to an interference measurement apparatus capable of noncontact detection of position change information of an object. It relates particularly, though not exclusively, to an interference measurement apparatus suitable for detecting absolute position shift information by adding a position as an origin when detecting displacement information.

2. Description of the Related Art

For a measurement apparatus capable of measuring length with accuracy and resolution of the order of nanometers, a laser interference measurement apparatus, such as a Michelson interference apparatus using a laser beam, is often used.

Since an interference wave generated by the displacement of the object being measured is a sine wave, a laser interference measurement apparatus can count the wave number of the sine wave and detect the phase of the sine wave to measure the amount of displacement to an accuracy and resolution of the order of nanometers.

Japanese Patent Laid-Open No. 2001-76325 describes an apparatus configured to obtain displacement information (position information) of a measurement plane by using an interference signal obtained by a Michelson interference apparatus.

The displacement detection apparatus described in Japanese Patent Laid-Open No. 2001-76325 uses optical interference to detect displacement information of a measurement plane provided on a magnetic head arm.

More specifically, a probe instruction arm for alignment is provided coaxial to the rotational shaft of the magnetic head arm.

On the probe instruction arm, an optical position detection sensor unit configured to detect whether or not the end surface (i.e., measurement plane) of the magnetic head arm is at a desirable position.

The optical position detection sensor unit includes a detection system configured to align the side surface of the magnetic head arm by using an interference signal. The detection system includes a quarter wave plate, a phase diffraction grating, and light-receiving element.

In addition, a focus detection optical system including a polarizing plate, a condenser lens, and a quadripartite sensor is provided to detect position information on the measurement plane in the direction of the optical axis.

The output signal of an interference measurement apparatus obtained by carrying out laser interference is a sine wave. Thus, measurement can be carried out at a resolution on the order of nanometers based on the wave number and phase. However, the absolute position cannot be determined merely by displacement. Therefore, to obtain absolute displacement information of the object being measured, an additional reference point (i.e., origin) must be provided and the relative position of the object with respect to this reference point must be determined.

In this case, to determine the accurate absolute position, the reference point (i.e., origin) must be provided at an accuracy surpassing the wavelength (0.4 μm for the example above) of the output sine wave obtained by carrying out laser interference.

The focus detection optical system of the displacement detection apparatus according to Japanese Patent Laid-Open No. 2001-76325 determines the origin of the measurement plane by detecting the ratio of the amounts of light incident upon the sensors of the quadripartite sensor. Thus, interference signals are not used.

For this reason, it is difficult to detect position information of the measurement plane at an accuracy of the order of the wavelength.

SUMMARY OF THE INVENTION

The above-identified problems have been taken into consideration to provide an interference measurement apparatus according to embodiments of the present invention. The present invention is capable of setting an origin with high accuracy and measuring displacement (absolute displacement) of an object being measured with high accuracy.

The interference measurement apparatus according to embodiments of the present invention includes a first light source configured to emit a first beam having high coherence; a second light source configured to emit a second beam having low coherence, the second beam having a central wavelength difference from the central wavelength of the first beam; a multiplexing unit configured to multiplex the first beam and the second beam onto the same optical axis to obtain a first multiplexed beam; a beam splitting unit configured to split the first multiplexed beam from the multiplexing unit into a second multiplexed beam and a third multiplexed beam; an interference unit configured to emit the second multiplexed beam obtained at the beam splitting unit to a measurement reflection plane of an object to be measured, emit the third multiplexed beam obtained at the beam splitting unit to a reference surface, then, multiplex the second multiplexed beam reflected from the reflection plane and the third multiplexed beam reflected from the reference surface, and let the first beam of the second multiplexed beam and the first beam of the third multiplexed beam to interfere with each other and the second beam of the second multiplexed beam and the second beam of the third multiplexed beam to interfere with each other; and a calculation unit configured to generate a first interference signal obtained from the first beams at the interference unit, the first interference signal relating to information on the distance to the measurement reflection plane, and a second interference signal obtained from the second beams and to determine the position of a measurement origin for the measurement reflection plane by using the interference intensity of the second interference signal and the phase difference of the first and second interference signals.

Other features and advantages of the present invention will be apparent from the following description taken in conjunction with the accompanying drawings, in which like reference characters designate the same or similar parts throughout.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 illustrates power spectra of beams LD and SLD according to the first embodiment.

FIG. 3 illustrates the visibility of the beam SLD according to the first embodiment.

FIG. 4 illustrates an output waveform of interference signals UVW from the beam LD according to the first embodiment.

FIG. 6 illustrates an output waveform of interference signals U'V'W' from the beam SLD according to the first embodiment.

FIG. 7 illustrates A' and B' phases calculated from the interference signals U'V'W' from the beam SLD according to the first embodiment.

FIG. 8 illustrates A and A' phases and the phase difference of LD and SLD interference signals according to the first embodiment.

DESCRIPTION OF THE EMBODIMENTS

First Embodiment

Embodiments of the present invention will be described in detail, by way of example only, in accordance with the accompanying drawings.

According to the embodiments, a low coherence laser beam is multiplexed onto the same optical axis as that of a high coherence laser beam generated by a single mode semiconductor laser. Here, the low coherence beam has a central wavelength moderately different from that of the high coherence laser beam and has a spectral half bandwidth of about 30 nm. An origin is determined on the basis of the phase difference between the interference outputs of the low coherence beam and the high coherence laser beam and intensity information of the interference output of the low coherence beam.

The wavelength of the high coherence laser beam is represented by $\lambda$, and the wavelength of the low coherence beam is represented by $\lambda'$. The light path length difference of a measurement reflection plane and a reference plane when the phase difference of the interference outputs of the high coherence beam and the low coherence beam is a predetermined value, e.g., zero, is represented by $\Delta V1$.

At this time, the light path length difference can be detected at intervals of $\pm\lambda\times\lambda'/(\lambda-\lambda')$ centering around zero within the coherence range of the low coherence beam.

The waveform of the interference output generated by the coherence of the low coherence beam is maximized and is substantially the same as the waveform of the high coherent laser beam in the vicinity of where the light path lengths of the measurement reflection plane and the reference plane are the same.

The position where the light path length difference is zero is detected on the basis of the position where the phase difference of the interference outputs of the high coherence laser beam and the low coherence beam is zero.

A sine wave interference output corresponding to where the light path length difference is zero is determined on the basis of the phase difference of the interference outputs of the high coherence laser beam and the low coherence beam. Then, an origin synchronized with the interference output of the high coherence laser beam is defined.

First Embodiment

Figure 1B:
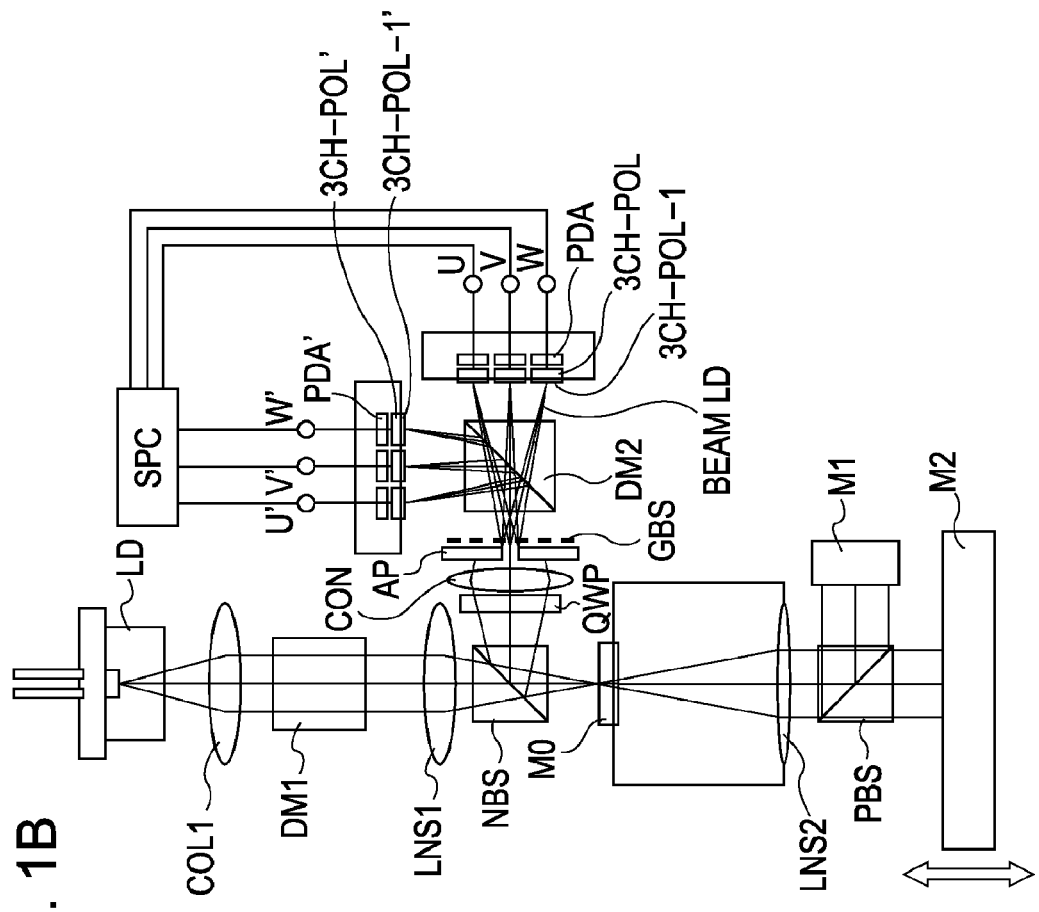
FIG. 1 shows schematic views of the optical arrangement of a first embodiment.
Figure 1A:
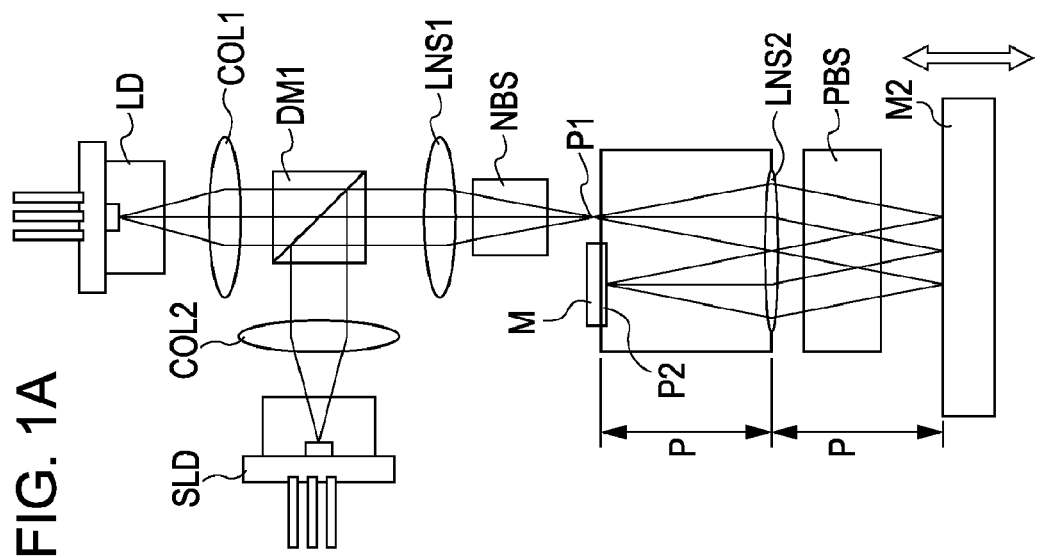

FIGS. 1A and 1B are a side view and a plan view, respectively, illustrating the main components of a first embodiment of the present invention.

A small interference measurement apparatus according to the first embodiment employs an origin detection unit.

As a high coherence single-mode semiconductor laser beam LD, a distributed feedback (DFB) laser having a stable wavelength $\lambda$ of 0.78 μm is used.

As a low coherence laser beam (diode laser beam) SLD, a super luminescent diode having spectral half bandwidth of about 10 nm and a central wavelength of about 0.82 μm is used. The spectra of the semiconductor laser beam LD and the diode laser beam SLD are illustrated in FIG. 2. The power spectrum of the semiconductor laser beam LD is an emission line at 0.78 μm. The power spectrum of the diode laser beam SLD has a central wavelength of 0.82 μm and a half bandwidth of about 10 nm.

The laser beams from the semiconductor laser LD and the diode laser SLD are collimated at collimator lenses COL1 and COL2, respectively. The beams are multiplexed to the same optical axis at a dichroic mirror DM1 and are directed through a lens LNS1 and a half mirror NBS. Then, the multiplexed beam is condensed to illuminate a position P1 on the focal plane of a lens LNS2.

From the position P1, the multiplexed beam is directed through the lens LNS2 as a collimated beam having a slightly tilted optical axis. Then, at a polarizing beam splitter (beam splitting unit) PBS, the multiplexed beam is split into two separate beams on the basis of polarization components. One of the beams (i.e., S polarized beam) reflected at the polarizing beam splitter PBS is incident on a reference mirror (reference plane) M1, whereas the other beam (i.e., P polarized beam) transmitted through the polarizing beam splitter PBS is incident on a measurement plane (mirror) M2, which is the surface to be measured.

The beams reflected at the reference mirror M1 and the measurement plane M2 are multiplexed at the polarizing beam splitter PBS and are condensed to illuminate a position P2 on the focal plane of the lens LNS2. Then, this multiplexed beam is returned to its original light path by a reflective film M0 provided in the vicinity of the position P2. The multiplexed beam from the position P2 is directed through the lens LNS2 as a collimated beam and is split into two separate beams at the polarizing beam splitter PBS. One of the beams (i.e., S polarized beam) reflected at the polarizing beam splitter PBS illuminates the reference mirror M1. The other beam (i.e., P polarized beam) transmitted through the polarizing beam splitter PBS illuminates the measurement plane (mirror) M2.

The beams reflected at the reference mirror M1 and the measurement plane M2 are multiplex at the polarizing beam splitter PBS and are condensed to illuminate the position P1 on the focal plane on the lens LNS2.

Subsequently, the beam is transmitted toward the side of the light source. Here, the S polarized beam is reciprocated between the reference mirror M1 and the polarizing beam splitter PBS twice, whereas the P polarized beam is reciprocated between the measurement plane M2 and the polarizing beam splitter PBS twice. These beams are transmitted toward the side of the light-receiving system via a non-polarizing beam splitter (half mirror) NBS. Then, each beam is transmitted through a quarter wave plate QWP so as to be converted into a linearly polarized beam in which the polarization direction is rotated in accordance with the change in phase difference.

The beam is transmitted through a condenser lens CON and an aperture stop AP and then split into three beams at a beam splitter GBS to separate laser beams LD (first beams) and laser beams SLD (second beams). The beams LD are transmitted through a dichroic mirror DM2 having the same structure as that of the dichroic mirror DM1, whereas the beams SLD are reflected at the dichroic mirror DM2. To separate the beams LD (first beams) and the beams SLD (second beams), the beams split into three beams are transmitted through a condenser lens CON and an aperture stop AP to a dichroic mirror DM2, having the same structure as that of the dichroic mirror DM1. At the dichroic mirror DM2, the beam LD and the beams SLD are separated by transmitting the beam LD and reflecting the beams SLD. The three beams LD transmitted through the dichroic mirror DM2 and the three beams SLD reflected from the dichroic mirror DM2 are transmitted through polarizing element arrays 3CH-POL and 3CH-POL', respectively. The polarizing elements of the polarizing element arrays 3CH-POL and 3CH-POL' have polarization axes different by 60° from each other. The three beams LD and the three beams SLD are incident on the three elements of the polarizing element arrays 3CH-POL and 3CH-POL', respectively, and are incident on the light-receiving parts of tripartition light-receiving elements PDA and PDA', respectively. In this way, interference signals UVW and U'V'W' are detected. The phases of the three interference signals UVW and the phases of the three interference signals U'V'W' in accordance with the out-of-plane displacement of the measurement plane (mirror) M2 are different by 120°.

At calculation unit SPC, A phase and B phase having phases different by 90° are calculated by the interference signals UVW, and A' phase and B' phase having phases different by 90° are calculated by the interference signals U'V'W'. The phase $\theta$ of the interference beam LD is determined by $\tan^{-1}(B/A)$, whereas the phase $\theta'$ of the beam SLD is determined by $\tan^{-1}(B'/A')$. The phase difference $\Delta\theta=\theta-\theta'$ of the phase $\theta$ of the interference beam LD and the phase $\theta'$ of the beam SLD is zero when the light path lengths of the measurement plane M2 and the reference mirror M1 are equal.

When the light path length is increased, the phase difference $\Delta\theta=\theta-\theta'$ of the interference beam LD and the beam SLD is linearly increased to $2\pi$, i.e., is returned to zero.

It can be determined that the light path lengths of the measurement plane M2 and the reference mirror M1 are not equal on the basis of the attenuation of the output of the beam SLD. Therefore, the origin can be set at a position where the light path lengths of the measurement plane M2 and the reference mirror M1 are equal.

The members provided in the light paths from the measurement plane M2 and the reference mirror M1 to the light-receiving elements PD2 and PDA constitute an element in the interference unit.

The embodiment will be described in detail below with reference to FIG. 2.

FIG. 2 illustrates power spectra of the beam LD from a semiconductor laser LD and the beam SLD from a diode SLD.

The power spectrum of the beam LD from the semiconductor laser LD is an emission line at 0.78 μm. The power spectrum of the beam SLD from the diode SLD is similar to a Lorentz type power spectrum in which the central wavelength is 0.82 μm and the half bandwidth is 10 nm. A power spectrum $S(\Delta\lambda)$ corresponding to the wavelength difference $\Delta\lambda$ from the central wavelength 0.82 μm of the beam SLD is represented by the following expression:

$$S(\Delta\lambda)=(\Delta\Lambda/2)2/\{\Delta\lambda 2+(\Delta\Lambda/2)2\} \qquad (1)$$

where, $\Delta\Lambda$ represents the half bandwidth, which is 10 nm in this case.

Based on FIG. 2, the dichroic mirrors DM1 and DM2 are set to have boundaries of transmission and reflection characteristics around 0.8 μm. Accordingly, the dichroic mirror DM1 is capable of multiplexing beams and the dichroic mirror DM2 is capable of splitting a beam.

The interference signals UVW obtained from the beam LD from the semiconductor laser LD have sufficiently high coherence.

The coherence and the visibility V ($\Delta V1$) of the interference signals U'V'W' obtained from the beam SLD from the diode SLD can be approximated by applying the following expression that is derived by carrying out inverse Fourier transformation to expression 1:

$$V(\Delta V1)=\text{Exp}\{-\pi\Delta\Lambda/\lambda 2\}\Delta V1 \qquad (2)$$

where, $\lambda$ represents the central wavelength of the beam SLD, which is 0.82 μm in this case, and $\Delta V1$ represents the light path length difference.

FIG. 3 illustrates the relationship between the light path length difference $\Delta V1$ and the visibility V.

Next, the polarization directions of the polarizing element 3CH-POL-1 of the polarizing element array 3CH-POL corresponding to the U output of the beam LD and the polarizing element 3CH-POL-1' of the polarizing element array 3CH-POL' corresponding to the U' output of the beam SLD are considered. The polarization direction is set to the direction in which a peak value is obtained when the difference of the light paths to the measurement plane M2 and the reference mirror M1 is equal to a predetermined value, e.g., zero. In this way, the U wave and the A phase of the beam LD are cosine waves with origins set at positions where the light path difference of the reference mirror M1 and the measurement plane M2 is zero, whereas the B phase is a sine wave.

The U' output and the A' phase of the beam SLD are cosine waves with origins set at positions where the light paths to the reference mirror M1 and the measurement plane M2 are equal and where the cosine wave attenuates as the distance becomes further away from the origin. The B' phase is a sine wave.

FIG. 4 illustrates ideal interference signals UVW generated from the beam LD from the semiconductor laser LD having nearly equal light paths.

Figure 5:
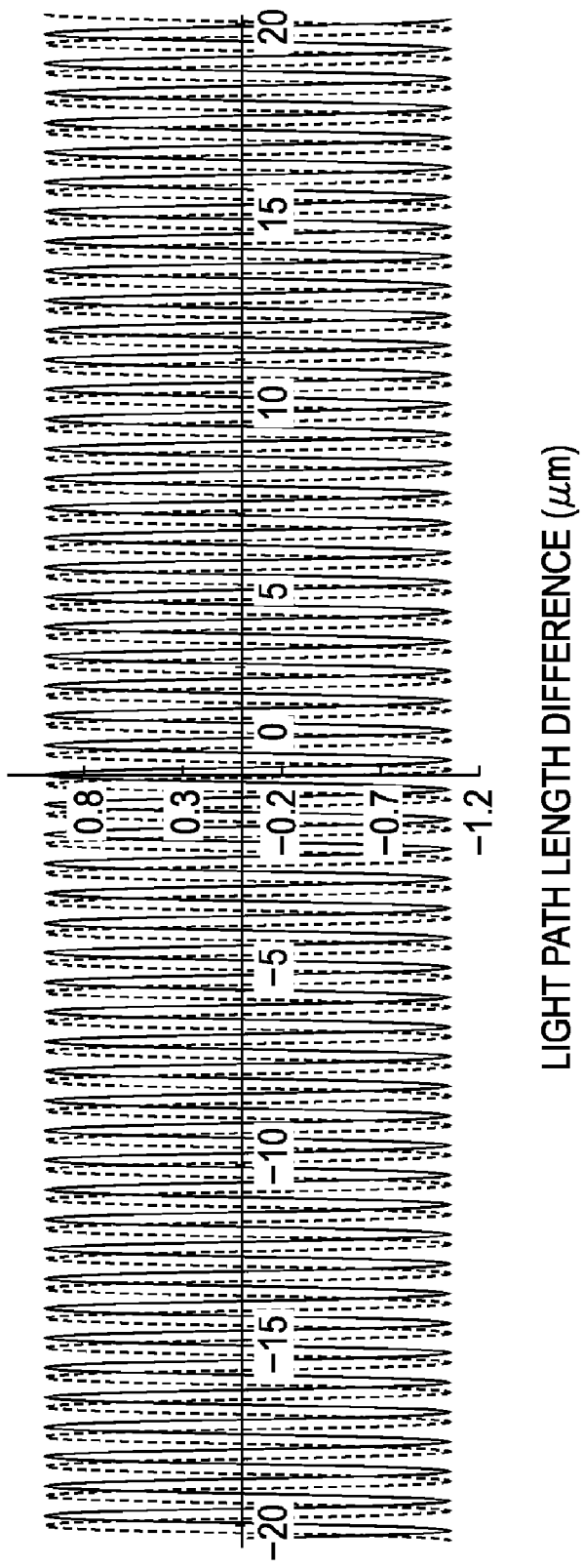
FIG. 5 illustrates A and B phases calculated from the interference signals UVW from the beam LD according to the first embodiment.

FIG. 5 illustrates the A and B phases having phases that are obtained by the expressions $A=2/3\times\{U-(V+W)/2\}$ and $B=1/\sqrt{3}\times(V-W)$, respectively, and being different by 90°.

FIG. 6 illustrates ideal interference signal U'V'W' from the beam SLD from the diode SLD. FIG. 7 illustrates the A' and B' phases having phases that are obtained by the expressions $A'=\{U'-(V'+W')/2\}$ and $B'=1/\sqrt{3}\times(V'-W')$, respectively and being different by 90°.

The horizontal axis represents the light path difference of the measurement plane M2 and the reference mirror M1. Since the beams are reciprocated two times, the displacement of the measurement plane M2 is ¼.

The phase $\theta$ of the beam LD is obtained from $\tan^{-1}(B/A)$, whereas the phase $\theta'$ of the beam SLD is obtained from $\tan^{-1}(B'/A')$.

The phase difference $\Delta\theta=\theta-\theta'$ of the phase $\theta$ of the beam LD and the phase $\theta'$ of the beam SLD is zero when the light paths to the measurement plane M2 and the reference mirror M1 are equal and changes linearly with respect to the light path difference of the measurement plane M2 and the reference mirror M1. FIG. 8 illustrates the A phase of the beam LD, the A' phase of the beam SLD, and the phase difference $\Delta\theta=\theta-\theta'$, which is set to zero about every 16 seconds (which are the points indicated by the upward arrows in the drawing).

The visibility of the output of the beam SLD at this time is calculated by the following expression:

$$\sqrt{A'^2+B'^2}$$

As shown in the drawing, it can be determined that the measurement plane M2 and the reference mirror M1 do not have equal light paths on the basis of the attenuation of the output of the beam SLD. Therefore, the position where the light paths to the measurement plane M2 and the reference mirror M1 are equal can be detected.

The wavelength 0.78 μm corresponds to $2\pi \times 0.78/16 \approx 0.3$ deg for the phase difference $\Delta\theta$ of the beam LD and the beam SLD. Thus, if the phase difference $\Delta\theta$ of the beam LD and the beam SLD is measured at ±0.15 deg or smaller, the waveform for one cycle of the beam LD at an equal light path position can be determined.

In this way, the origin can be defined in synchronization with the interference signal from the beam LD.

The 90°-different A and B phases of the interference signals UVW from the semiconductor laser LD are based on the principle of an interferometric measurement by a double reciprocal light path. Therefore, interference signals are sine wave signals having a signal period of ¼ of the wavelength of the interference signal U from the semiconductor laser LD. When a laser diode SLD having a wavelength of 0.78 μm is used, a sine wave signal having a period of 0.195 μm is obtained. The wave number is counted and the phase is calculated by $\tan^{-1}(B/A)$ to detect the relative displacement with a resolution of the order of nanometers.

By resetting the counted wave number when a zero light path difference is detected, as described above, from the phase difference of the beam LD and the beam SLD and the interference (visibility) of the beam SLD and the absolute value of the origin can be measured on the order of nanometers.

As described above, according to this embodiment, a first interference signal (period signal) related to distance information of the measurement plane M2 is generated from the beams LD at the interference unit.

Furthermore, a second interference signal that has maximum amplitude when the distances to the measurement plane M2 and the reference mirror M1 are equal and has amplitude that attenuates in response to the distance is generated at the beams SLD.

Absolute displacement information is obtained by determining a measurement origin at a position where the measurement plane M2 and the reference mirror M1 are equal light paths on the basis of the intensity of interference of the second interference signal and a position where the phase difference of the first and second interference signals is a predetermined value, e.g., zero.

Second Embodiment

Figure 9B:
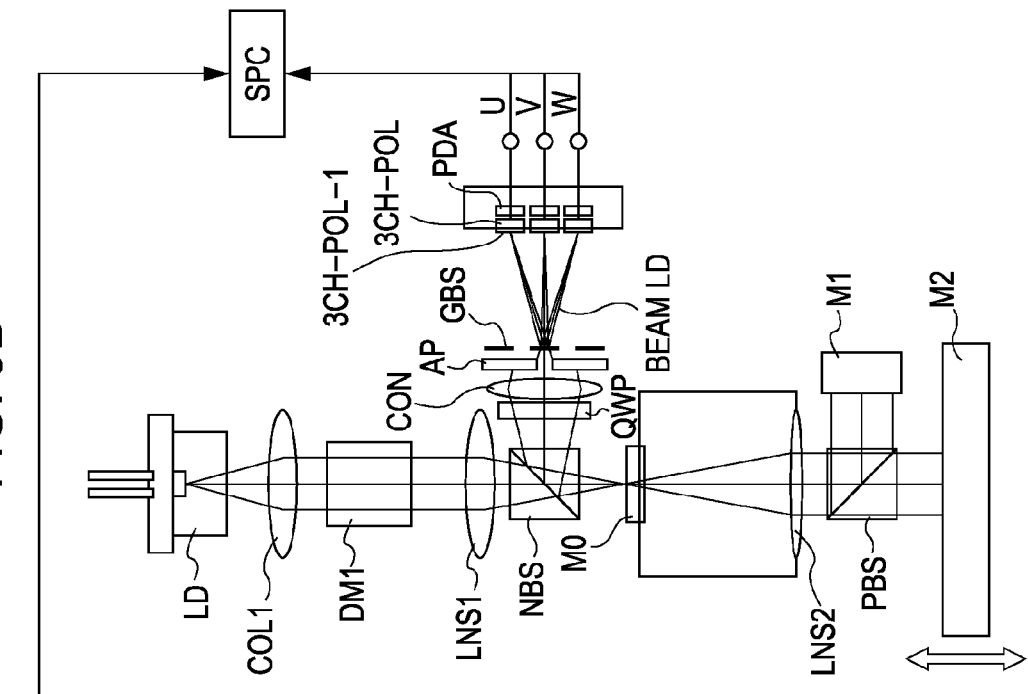
FIG. 9 shows schematic views of the optical arrangement of a second embodiment.
Figure 9A:
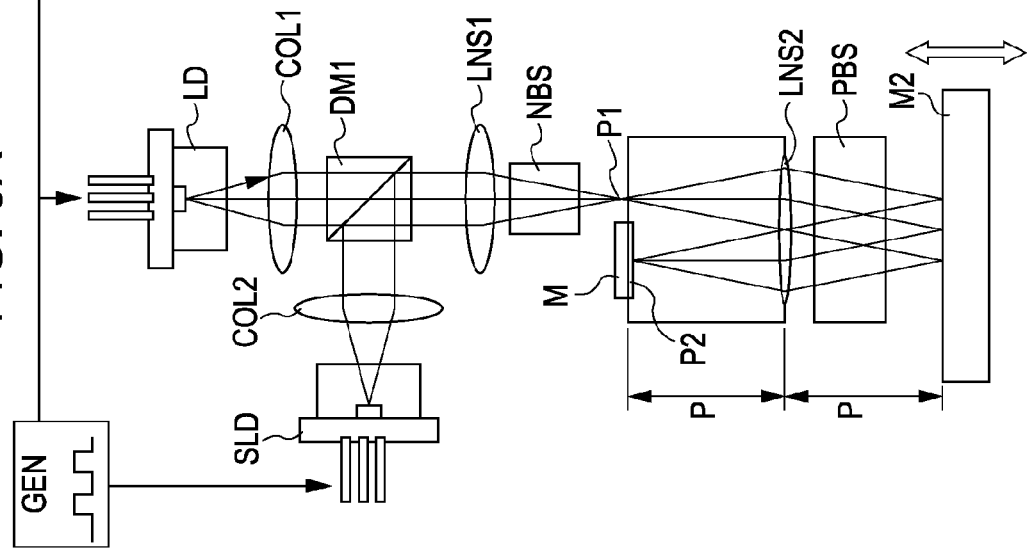

FIG. 9 illustrates a schematic view of the main components of a second embodiment of the present invention.

The differences of the second embodiment and the first embodiment are listed below.

(a) The semiconductor laser LD and the diode SLD are alternately turned on and off while the origin is being detected.

(b) The polarization element array 3CH-POL and the tripartition light-receiving elements PDA are included in both the SLD light-receiving system and the LD light-receiving system for receiving the interference signal from the semiconductor laser LD.

The interference signals UVW from the beam LD and the interference signals U'V'W' from the beam SLD are sampled and separated at a signal processing unit SPC in accordance with illumination. While the interference signals are not emitted, interpolation and estimation are carried out to obtain the interference signals UVW from the LD and the interference signals U'V'W' continuously.

(c) The signals do not have to be separated by wavelength.

The origin is defined in synchronization with the interference signals from the beam LD, in the same manner as the first embodiment, on the basis of the interference signals U'V'W' from the beam SLD and the interference signals UVW from the beam LD obtained as described above.

According to the second embodiment, since sampling is carried out in time series by turning on and off the diode SLD when detecting the origin, the movement of the measurement plane M2 has to be sufficiently faster than the sampling frequency.

However, in general, the movement of the measurement plane M2 is slower than the electric sampling so long as the movement of the measurement plane M2 is a mechanical movement. Thus, detection of the origin is easy.

Third Embodiment

The structure according to a third embodiment of the present invention is substantially the same as that illustrated in FIG. 9.

According to the third embodiment, instead of alternately turning on and off the driving of the semiconductor laser LD and the diode SLD when the origin is being detected, the semiconductor laser LD is constantly turned on.

The semiconductor laser LD is matched with the on and off of the driving of the diode SLD.

For example, the interference signals UVW from the beam LD is obtained when the diode SLD is turned off.

When the diode SLD is turned on, a signal obtained by superimposing the interference signals UVW from the semiconductor laser LD and the interference signals U'V'W' from the diode SLD is sampled and separated at the signal processing unit SPC. Interpolation and estimation is carried out on the interference signals to obtain continuous interference signals UVW and a signal obtained by superimposing the interference signals U'V'W' on the interference signals UVW.

Figure 10:
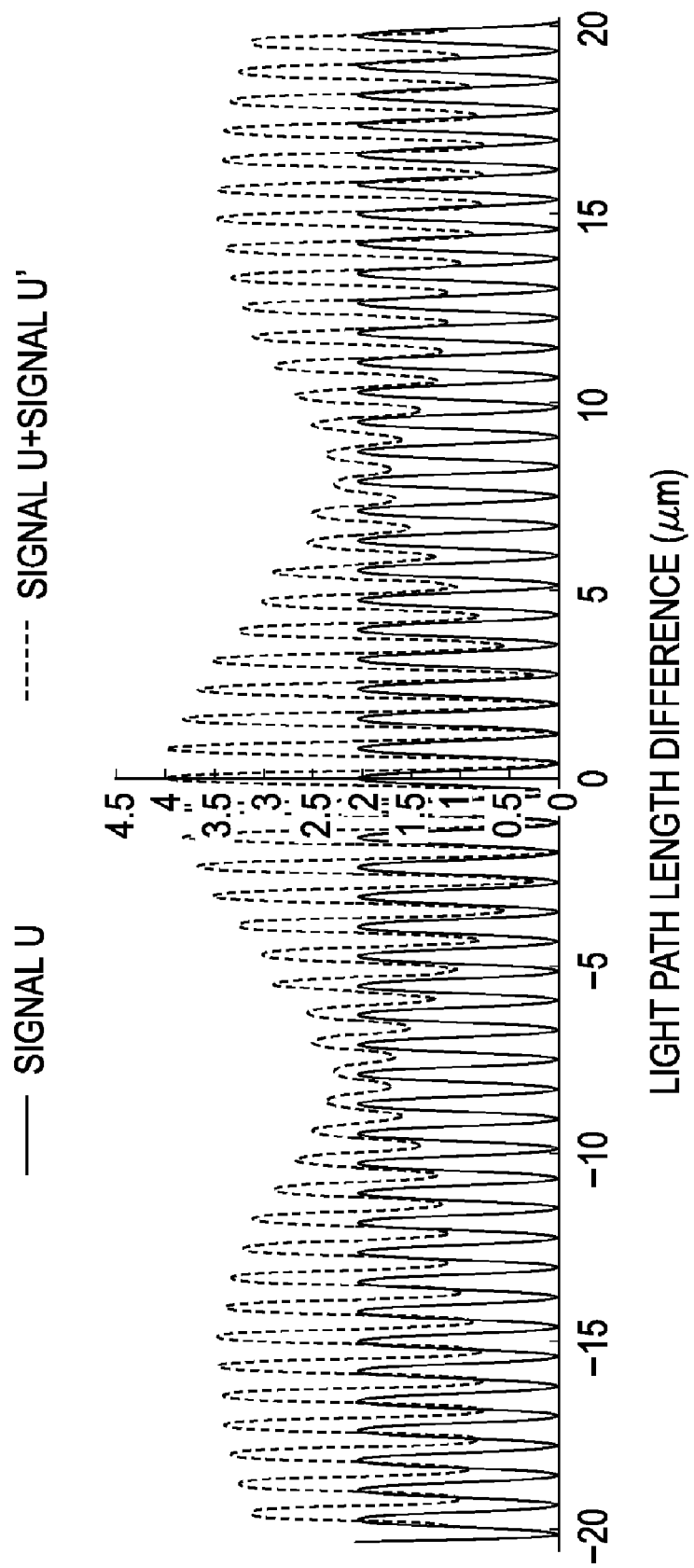
FIG. 10 illustrates an output waveform of an interference signal U and an interference signal (U+U') according to the second embodiment.

FIG. 10 illustrates the waveforms of the signal U of the continuous interference signals UVW obtained by interpolation and estimation and the signal (U+U') of the interference signal obtained by superimposing the interference signals U'V'W' on the interference signals UVW near a position where the light path from the polarizing beam splitting unit PBS to the measurement plane M2 and the reference mirror M1 are equal.

The interference signals U'V'W' is obtained by carrying out subtraction on the interference signal in which the interference signals U'V'W' are superimposed to the interference signals UVW. The origin is defined in synchronization with the interference signals from the beam LD in the same manner as the first embodiment from the interference signals U'V'W' from the beam SLD and the interference signals UVW from the beam LD obtained as described above.

According to the third embodiment, the semiconductor laser LD is constantly illuminated. However, instead, the diode SLD may be constantly illuminated, and the semiconductor laser LD may be turned on and off.

It is desirable to maintain the temperature of the semiconductor laser LD so as to stabilize the laser oscillation.

However, if the semiconductor laser device is turned on and off, the temperature of the light-emitting unit of the semiconductor laser device changes due to thermal resistance of the semiconductor laser device when turned on. Thus, the single-mode laser oscillation may be unstable. Therefore, as described in the third embodiment, it is desirable to constantly illuminate the semiconductor laser LD.

As described above, according to the third embodiment, two different light sources are alternately turned on and off.

In accordance with the illumination of the beams LD and SLD, the interference beams are received by the light-receiving unit. The waveforms of the interference signals are interpolated and estimated on the basis of the beams LD and SLD received at the light-receiving unit. In this way, a measurement origin is defined at a position where the light path lengths from the measurement plane M2 and the reference mirror M1 to the polarizing beam splitter PBS are equal.

Instead, only one of the two light sources (first and second light sources) may be turned on and off. In such a case, an interference beam is detected from a beam from the first light sources while the second light source is turned off. An interference beam having a signal obtained by superimposing the interference signal from the beam SLD to the interference signal from the beam LD is received at the light-receiving unit while the second light source is turned on.

The waveform of the interference signal based on a beam from the first or second light source, whichever is being turned on, is interpolated and estimated.

In this way, the measurement origin is defined at a position where the light path lengths from the measurement plane M2 and the reference mirror M1 to the polarizing beam splitter PBS are equal.

According to the embodiments described above, the super luminescent diode SLD is used as a light source of the low coherence interference beam. The power spectrum of this beam is similar to a Lorentz type power spectrum but is not exactly the same. Therefore, in such a case, the visibility and the envelope curves of the interference signals U'V'W' are also different.

However, the greater the half bandwidth of the power spectrum is, the greater the peak of the origin (i.e., peak amplitude) is compared to the adjacent peak. Thus, detection is easier, whereas detection is more difficult when the half bandwidth of the power spectrum is small.

If the power spectra of the high coherence beam and the low coherence beam are similar, the light path difference when the phase difference $\Delta V\theta$ of the interference signal of the high coherence beam and the interference signal of the low coherence beam is zero becomes great. Thus, detection becomes easy at the visibility of the low coherence beam.

However, the change in the phase difference $\Delta V\theta$ with respect to the light path difference becomes small, and, thus, determining a one cycle waveform of the interference signal of the low coherence beam at the origin becomes difficult. It is necessary that the phase difference $\Delta V\theta$ of the interference signal of the high coherence beam and the interference signal of the low coherence beam is zero when the light paths to the reference mirror M1 and the measurement plane M2 are equal and that the one cycle waveform of the interference signal of the low coherence beam at the point can be detected.

According to the embodiments described above, a dichroic mirror is used to multiplex the high coherence interference beam and the low coherence interference beam. However, a half mirror may be used for convenience although the light efficiency is lower.

As a small light source for the low coherence interference beam, a current constriction type point light source light-emitting diode may also be used although the directionality is wide and the use efficiency of light is low.

The embodiments may also be applied to a gas laser interference measurement apparatus using a mirror or a corner cube for the object to be measured. As a light source of a low coherence beam, a xenon lamp or a white point light source constituting a pin hole may also be used.

Instead of the DFB laser diode, a single mode surface-emitting semiconductor laser, e.g., a vertical cavity surface-emitting laser (VCSEL), controlled at a constant temperature or a gas laser, such as a helium-neon (He—Ne) laser, may be used.

According to the above-described embodiments, the origin can be defined at a resolution of the order of nanometers in synchronization with an output sine wave of laser interference.

Accordingly, it is easy to obtain absolute position information at a resolution on the order of nanometers.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-218981 filed Jul. 28, 2005, which is hereby incorporated by reference herein in its entirety.

What is claimed is:

1. An absolute position measurement apparatus comprising:
    a first light source configured to emit a first beam having high coherence;
    a second light source configured to emit a second beam having low coherence, the second beam having a central wavelength difference from the central wavelength of the first beam;
    a multiplexing unit configured to multiplex the first beam and the second beam onto the same optical axis to obtain a first multiplexed beam;
    a polarization beam splitting unit configured to split the first multiplexed beam from the multiplexing unit into a second multiplexed beam and a third multiplexed beam, and to multiplex the second multiplexed beam reflected from a measurement reflection plane of an object and the third multiplexed beam reflected from a reference surface;
    a wave plate allowing the first beam of the second multiplexed beam and the first beam of the third multiplexed beam to interfere with each other, and allowing the second beam of the second multiplexed beam and the second beam of the third multiplexed beam to interfere with each other;
    a light-receiving unit configured to detect a first interference beam obtained from a first beams and a second interference beam obtained from the second beams; and
    a calculation unit configured to determine the position of a measurement origin for the measurement reflection plane by using the interference intensity of the second interference signal obtained from the second interference beam at the light-receiving unit and the phase difference of the first interference signal obtained from the first interference beam at the light-receiving unit and the second interference signal and to obtain the absolute position of the object on the basis of the position of the measurement origin.

2. The absolute position measurement apparatus according to claim 1, wherein the measurement origin is set at a position where the phase difference of the first and second interference signals is zero.

3. The absolute position measurement apparatus according to claim 2, wherein,
the amplitude of the second interference signal is maximized when distances to the measurement reflection plane and the reference plane are the same, and
the amplitude of the second interference signal attenuates in accordance with the distances.

4. The absolute position measurement apparatus according to claim 1, wherein,
the amplitude of the second interference signal is maximized when distances to the measurement reflection plane and the reference plane are the same, and
the amplitude of the second interference signal attenuates in accordance with the distances.

5. The absolute position measurement apparatus according to claim 1, wherein,
the light-receiving includes,
a first light-receiving sub-unit configured to detect a first interference signal obtained from the first, and
a second light-receiving sub-unit configured to detect a second interference signal obtained from the second beams.

6. The absolute position measurement apparatus according to claim 5, wherein the first light-receiving sub-unit comprises a plurality of the light-receiving elements, each of the light-receiving elements receiving the first interference signals whose phase is different from each other.

7. The absolute position measurement apparatus according to claim 1, wherein the first and second light sources are configured to turn on and off alternately, and the calculation unit is configured to interpolate and estimate the waveforms of the first and second interference signals obtained from the first and second interference beams and to determine the position of the measurement origin from the interpolated and estimated signals.

8. The absolute position measurement apparatus according to claim 1, wherein one of the first and second light sources is configured to turn on and off, and the calculation unit is configured to interpolate and estimate the waveforms of one of the first and second interference signals detected at the light-receiving unit while one of the light sources is turned off and the waveforms of the superimposed interference signal of the first and second interference signals detected at the light-receiving unit while both the first and second light sources are turned on and to determine the position of the measurement origin from the interpolated and estimated signals.

9. The absolute position measurement apparatus according to claim 1, wherein the light-receiving unit comprises a plurality of the light-receiving elements, each of the light-receiving elements receiving the first interference signals whose phase is different from each other.

* * * * *